United States Patent
Li et al.

(10) Patent No.: US 11,704,088 B2
(45) Date of Patent: Jul. 18, 2023

(54) INTELLIGENT CONTROL METHOD AND ELECTRONIC DEVICE

(71) Applicant: Lenovo (Beijing) Limited, Beijing (CN)

(72) Inventors: Jing Li, Beijing (CN); Liang Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/682,933

(22) Filed: Feb. 28, 2022

(65) Prior Publication Data

US 2023/0095078 A1  Mar. 30, 2023

(30) Foreign Application Priority Data

Sep. 27, 2021 (CN) .......................... 202111134745.3

(51) Int. Cl.
| | |
|---|---|
| *G06F 3/16* | (2006.01) |
| *G06F 3/147* | (2006.01) |
| *G06F 3/14* | (2006.01) |
| H04M 1/72409 | (2021.01) |
| H04L 67/12 | (2022.01) |
| H04L 65/65 | (2022.01) |

(52) U.S. Cl.
CPC .............. *G06F 3/165* (2013.01); *G06F 3/147* (2013.01); *G06F 3/1415* (2013.01); *G09G 2370/047* (2013.01); *H04L 65/65* (2022.05); *H04L 67/12* (2013.01); *H04M 1/72409* (2021.01)

(58) Field of Classification Search
CPC ........ G06F 3/165; G06F 3/1415; G06F 3/147; G09G 2370/047; H04L 65/65; H04L 67/12; H04M 1/72409
USPC .......................................................... 345/3.1
See application file for complete search history.

(56) References Cited

U.S. PATENT DOCUMENTS

| | | | |
|---|---|---|---|
| 2010/0315553 A1* | 12/2010 | Takatsuji ............... | G09G 5/006 348/E9.034 |
| 2014/0297882 A1* | 10/2014 | Estrop .............. | H04N 21/43072 709/231 |
| 2015/0193192 A1* | 7/2015 | Kidron .................... | G06F 3/165 700/94 |
| 2017/0125034 A1* | 5/2017 | Kakadiaris .............. | G06F 3/165 |
| 2017/0357474 A1* | 12/2017 | Ferris .................. | G06F 13/4282 |
| 2019/0058948 A1* | 2/2019 | Gupta .................... | G06F 3/0482 |
| 2019/0141089 A1* | 5/2019 | Loheide ............. | H04N 21/2668 |
| 2021/0182015 A1* | 6/2021 | Zhang ............... | H04M 1/72442 |

* cited by examiner

*Primary Examiner* — Tom V Sheng
(74) *Attorney, Agent, or Firm* — Anova Law Group, PLLC

(57) ABSTRACT

Intelligent control method and device, and electronic device are provided. The method includes transmitting display data and audio data in real time for a projection device through a data channel connected to the projection device; monitoring a state of the data channel and an output state of the audio data on the projection device; and controlling the audio data transmitted in real time to be switched to a playback device for output if the state of the data channel is a connected state and the output state of the audio data on the projection device is an ineffective output state.

18 Claims, 15 Drawing Sheets

INTELLIGENT CONTROL METHOD AND ELECTRONIC DEVICE

CROSS-REFERENCE TO RELATED APPLICATION

This application claims priority of Chinese Patent Application No. 202111134745.3, filed on Sep. 27, 2021, the entire contents of which are hereby incorporated by reference.

FIELD OF THE DISCLOSURE

The present disclosure generally relates to the field of screen projection technology and, more particularly, relates to an intelligent control method and device and an electronic device.

BACKGROUND

To achieve a screen expansion, screen projection technology is currently applied to output pictures and sounds of a projection device to a projected device. The projected device outputs the pictures and sounds.

However, a projected device may be connected to a plurality of projection devices. When the projected device outputs pictures and sounds of a projection device, since a transmission channel between the projection device and the projected device is not disconnected, the pictures and sounds of the projection device are still sent to the projected device, so that no sounds can be output by the projection device.

BRIEF SUMMARY OF THE DISCLOSURE

One aspect of the present disclosure provides an intelligent control method. The method includes transmitting display data and audio data in real time for a projection device through a data channel connected to the projection device; monitoring a state of the data channel and an output state of the audio data on the projection device; and controlling the audio data transmitted in real time to be switched to a playback device for output in response to the state of the data channel being a connected state and the output state of the audio data on the projection device being an ineffective output state.

Another aspect of the present disclosure provides an electronic device. The electronic device includes a memory and a processor. The memory is configured for storing application programs and data generated by running the application programs. The processor is coupled with the memory and, when the application programs being executed, configured to: transmit display data and audio data for a projection device in real time through a data channel connected to the projection device, monitoring a state of the data channel and an output status of the audio data on the projection device and controlling the audio data transmitted in real time to be switched to a playback device for output in response to the state of the data channel being a connected state and the output state of the audio data on the projection device being an ineffective output state.

Another aspect of the present disclosure provides a non-transitory computer readable storage medium containing application programs. When being executed, the application programs cause a processor to perform an intelligent control method. The method includes transmitting display data and audio data in real time for a projection device through a data channel connected to the projection device; monitoring a state of the data channel and an output state of the audio data on the projection device; and controlling the audio data transmitted in real time to be switched to a playback device for output in response to the state of the data channel being a connected state and the output state of the audio data on the projection device being an ineffective output state.

Other aspects of the present disclosure can be understood by a person skilled in the art in light of the description, the claims, and the drawings of the present disclosure.

BRIEF DESCRIPTION OF THE DRAWINGS

To illustrate technical solutions in embodiments of the present disclosure more clearly, the following briefly introduces accompanying drawings that need to be used in a description of the embodiments. Obviously, the accompanying drawings in the following description are only some embodiments of the present disclosure. For a person skilled in the art, other drawings can also be obtained from the accompanying drawings without creative efforts.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all the embodiments. Based on the embodiments in the present disclosure, all other embodiments obtained by a person skilled in the art without creative efforts shall fall within the protection scope of the present disclosure.

Figure 1:
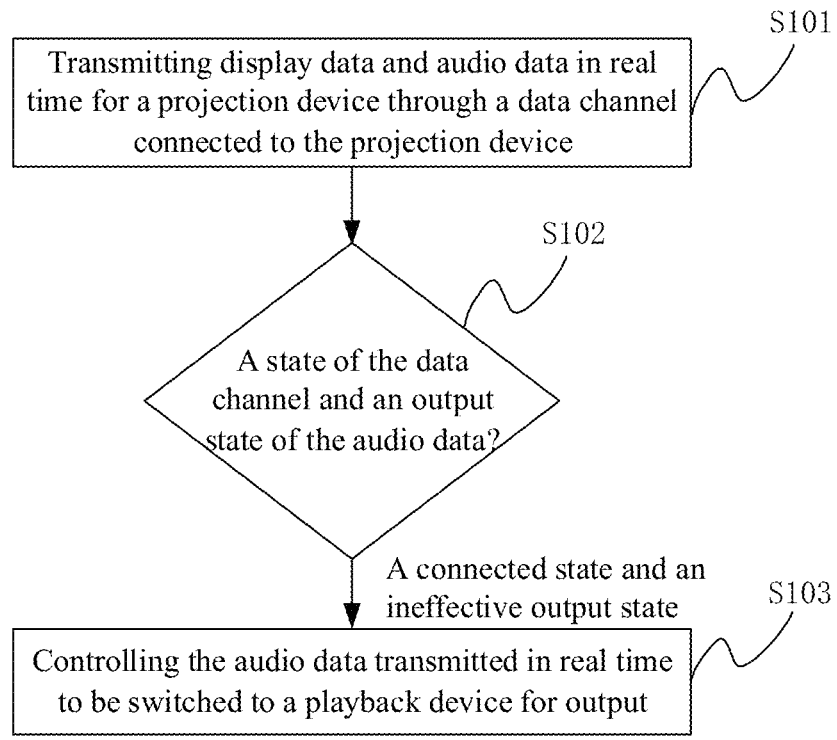
FIG. 1 illustrates a flowchart of an intelligent control method consistent with various embodiments of the present disclosure.
Figure 2:
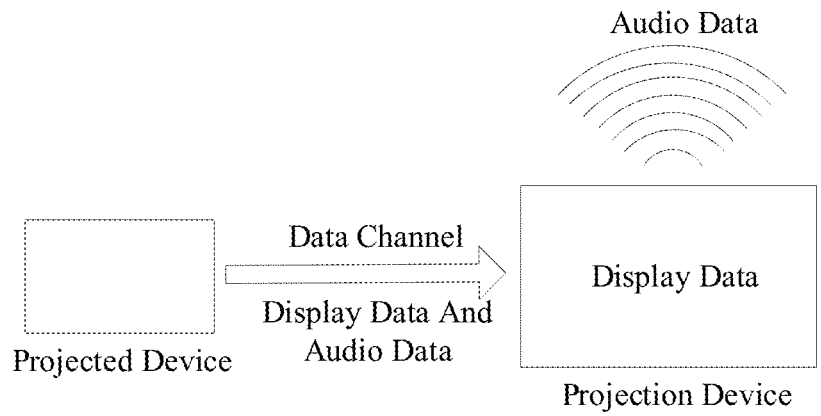
FIGS. 2-7 illustrate application examples consistent with various embodiments of the present disclosure.

FIG. 1 illustrates a flowchart of an intelligent control method consistent with various embodiments of the present disclosure. The method can be applied to an electronic device capable of establishing a data channel with a projection device, that is, a projected device, such as a mobile phone, a pad, a notebook, or a computer with a display screen. The projection device can be a TV, a notebook, or a computer. As shown in FIG. 2, a data channel is established between a projected device and a projection device. The data channel can be a data channel realized by a high-definition multimedia interface (HDMI) between a mobile phone or a notebook and a TV and can also be a data channel implemented by other wired interfaces or wireless interfaces capable of data transmission.

Specifically, the method in this embodiment may include following steps.

In S101: transmitting display data and audio data in real time for a projection device through a data channel connected to the projection device.

The display data can be understood as picture data such as images or videos; and the audio data can be understood as sound data. When a data channel is connected between a projected device and the projection device, the projected device transmits the display data and the audio data to the projection device, and the projection device outputs the display data and the audio data of the projected device.

In one case, the projected device continuously transmits the display data and the audio data, so that the display data and the audio data transmitted by the projected device are output continuously on the projection device.

In another case, the projected device continuously transmits the display data, and only outputs the audio data to the projection device when the audio data needs to be output. Therefore, the display data transmitted by the projected device is continuously output on the projection device. When the projected device transmits the audio data to the projection device, the audio data is output on the projection device, while the data channel between the projected device and the projection device is continuously in a connected state.

Figure 3:
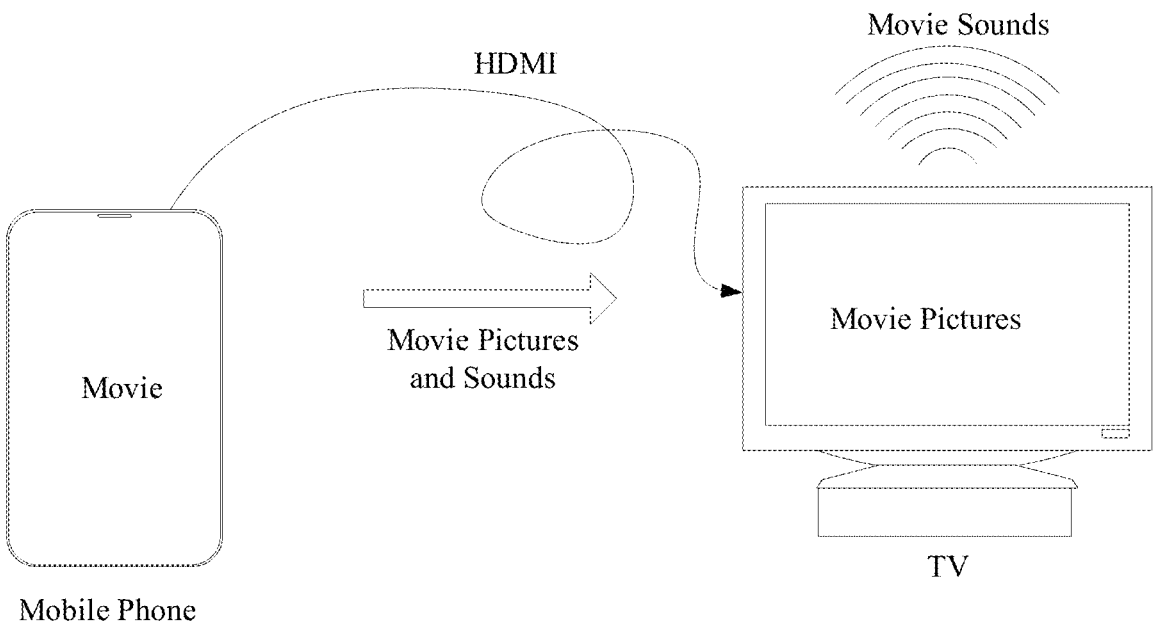
Figure 4:
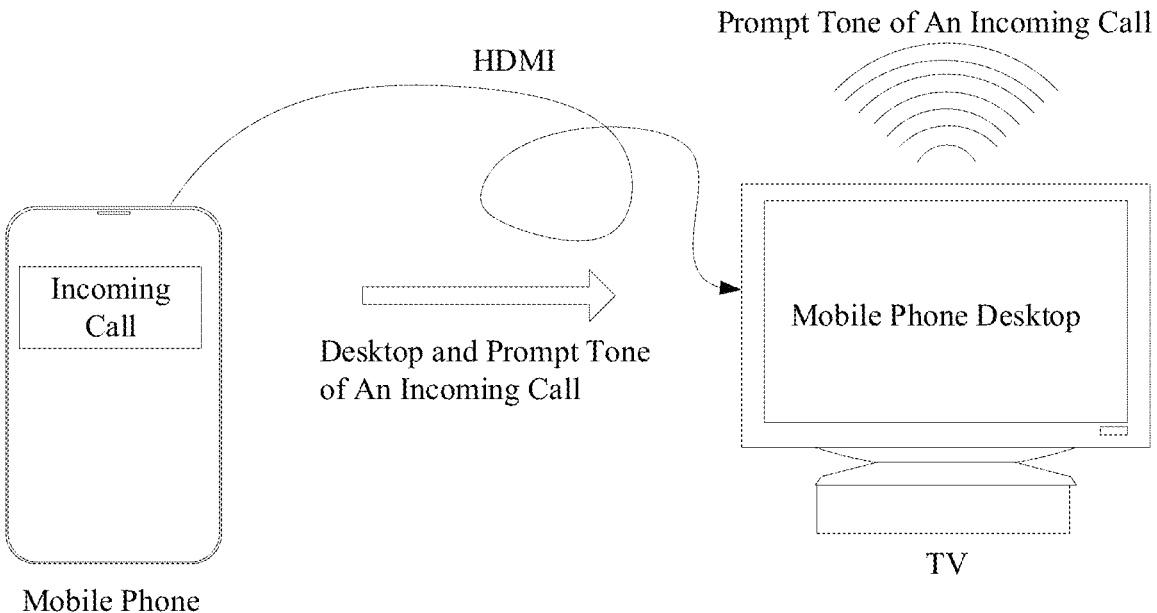

For example, after a data channel is established between a mobile phone and a TV through an HDMI, the data channel can transmit picture data and sound data on the mobile phone. As shown in FIG. 3, after the mobile phone projects a mobile phone desktop to the TV, when the mobile phone plays a movie, pictures and sounds of the movie being played are transmitted to the TV through the HDMI, and are output. by the TV. As shown in FIG. 4, when the mobile phone does not play a movie, the desktop is projected on the TV through the HDMI, the mobile phone desktop is displayed on the TV. When there is a message or incoming call, a prompt tone is transmitted to the TV through HDMI, and the prompt tone transmitted by the mobile phone is output on the TV.

In S102: monitoring a state of the data channel and an output state of the audio data on the projection device.

As the state of the data channel is a connected state and the output state of the audio data on the projection device is an ineffective output state, S103 is performed. As the state of the data channel is not a connected state and the output state of the audio data on the projection device is an effective output state, S102 is performed to continue to monitor whether the state of the data channel is a connected state and whether the output state of the audio data on the projection device is an ineffective output state.

The data channel has a connected state or an unconnected state. When the data channel is in a connected state, the display data and the audio data of the projected device can be output to the projection device in real time through the data channel. When the data channel is in an unconnected state, the display data and the audio data of the projected device cannot be output to the projection device in real time.

The output state of the audio data on the projection device can have an effective output state and an ineffective output state. When the audio data is received but not output on the projection device, the output state of the audio data on the projection device is an ineffective output state. When the audio data is received by and output from the projection device, the output state of the audio data on the projection device is an effective output state.

As the state of the data channel is a connected state and the output state of the audio data on the projection device is an ineffective output state, a user around the projection device cannot listen to the audio data transmitted from the projected device to the projection device. Since the projected device outputs audio data in the data channel between the projected device and the projection device, the projected device will not output audio data at a same time. Therefore, when the output state of the audio data on the projection device is an ineffective output state, the user cannot listen to the audio data even as the user is around the projection device and the projected device.

Therefore, in the embodiment, when the state of the data channel and the output state of the audio data on the projection device are continuously monitored, and it is detected that the state of the data channel is a connected state but the output state of the audio data on the projection device is an ineffective output state, that is, when a user around the projection device cannot listen to the audio data transmitted by the projected device to the projection device, S103 may be performed so that the user can listen to the audio data.

In S103: controlling the audio data transmitted in real time to be switched to a playback device for output.

The playback device may be a device different from the projection device.

In an implementation, the playback device may be a playback device on the projected device, such as an earpiece or an external speaker on a mobile phone.

In another implementation, the playback device may be a device that is different from the projected device but is connected to the projected device, such as a Bluetooth speaker connected to a mobile phone through Bluetooth.

Figure 5:
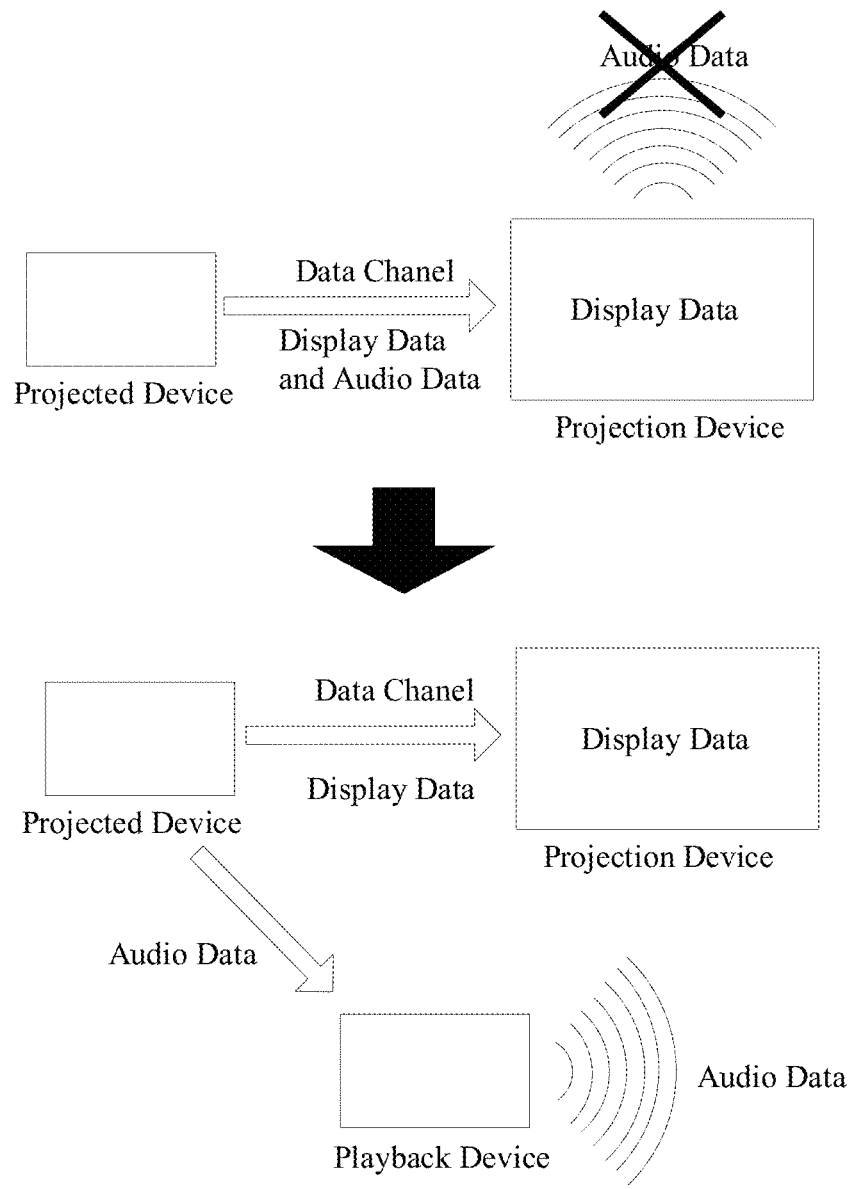

Therefore, in the embodiment, when it is detected that the state of the data channel is a connected state but the output state of audio data on the projection device is an ineffective output state, that is, when a user around the projection device cannot listen to the audio transmitted from the projected device to the projection device, as shown in FIG. 5, the user can output the audio data that cannot be effectively output by the projection device through the playback device, thereby avoiding a situation in which a user cannot hear the audio data.

Figure 6:
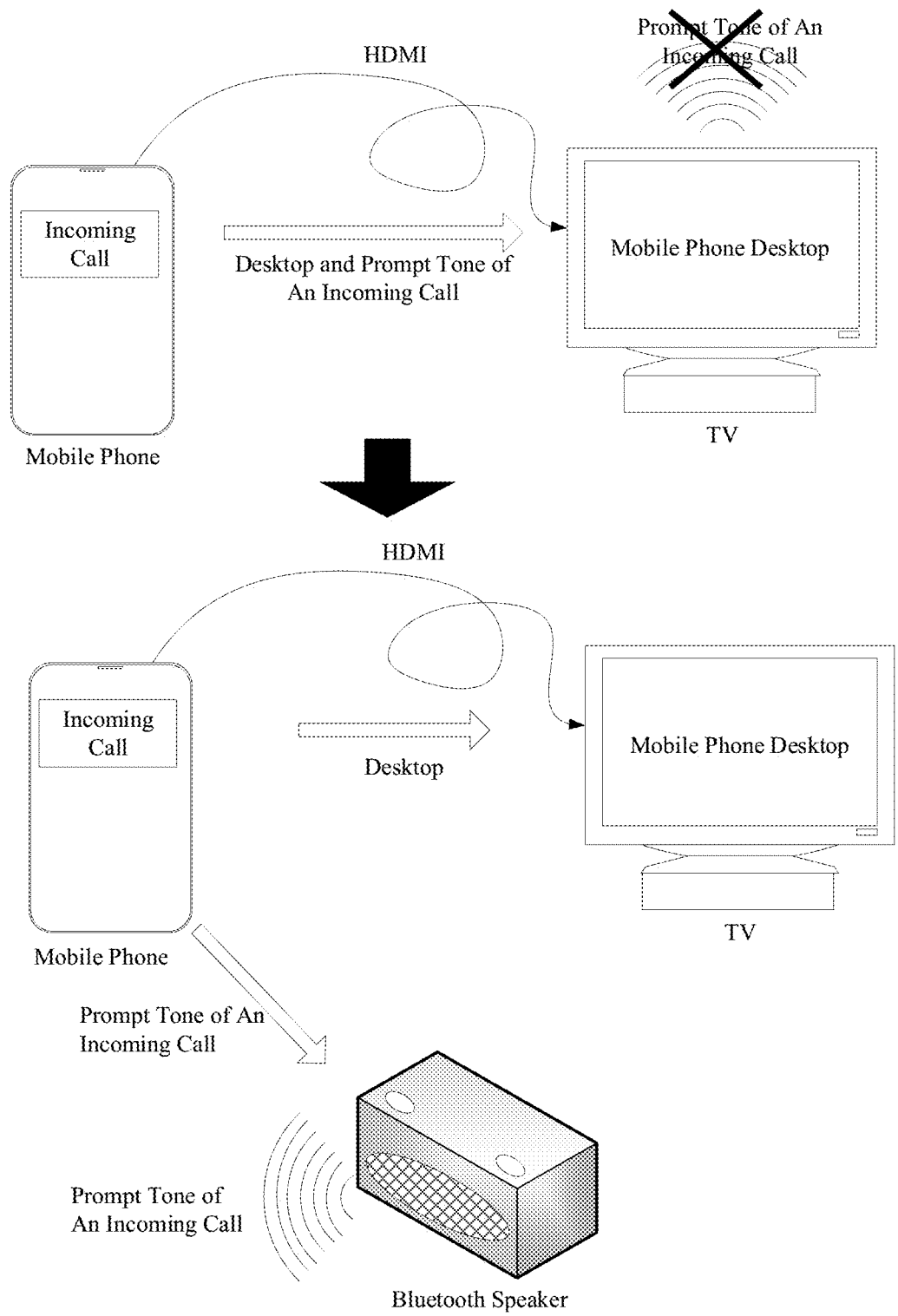
Figure 7:
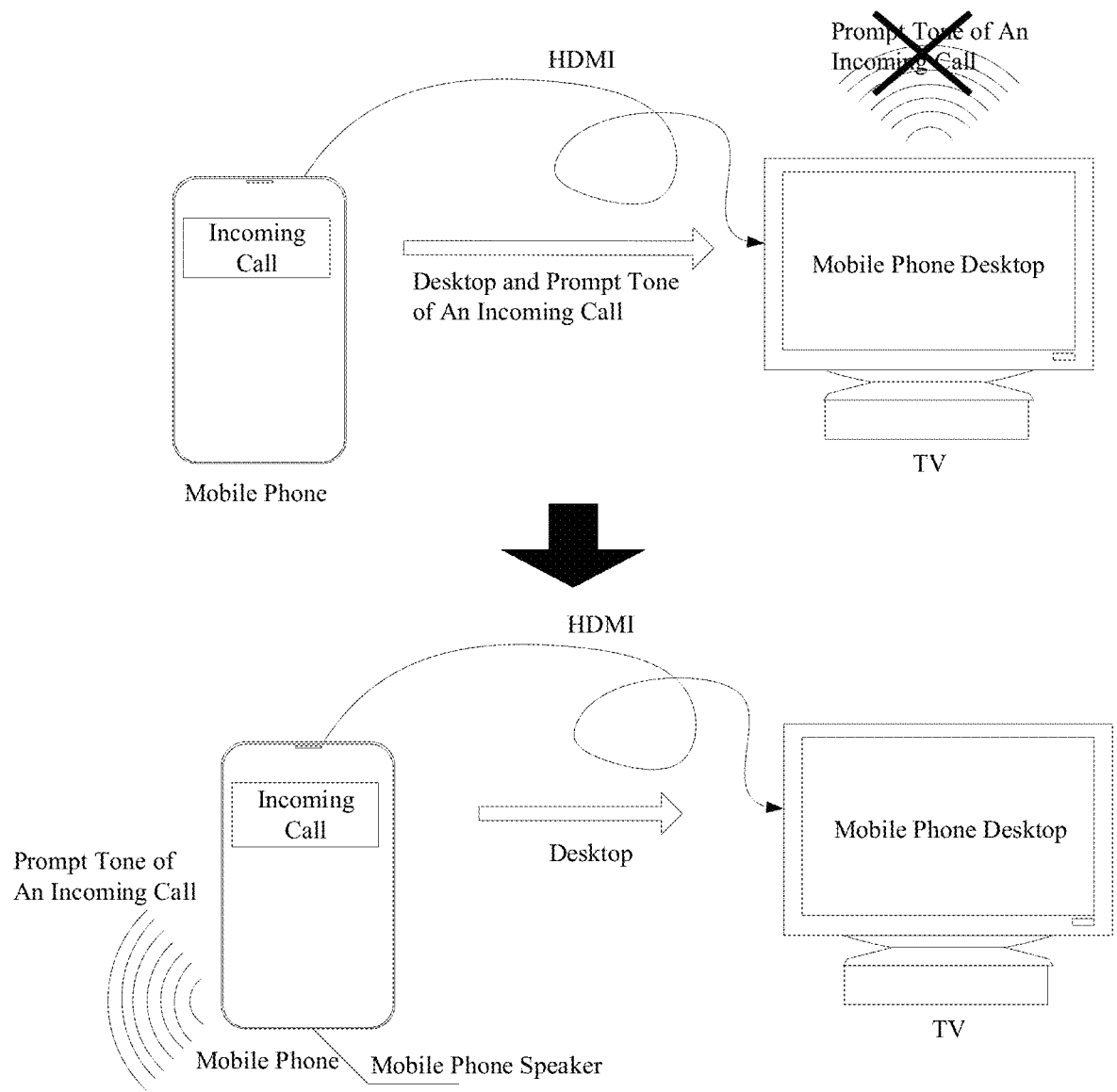

For example, as shown in FIG. 6 and FIG. 7, when it is detected that a prompt tone of an incoming call transmitted by a mobile phone is not output on a TV, the prompt tone of an incoming call of the mobile phone is switched to a Bluetooth speaker or a mobile phone speaker for output. Therefore, a user is prompted of an incoming call on the mobile phone, thereby avoiding a situation that when an HDMI channel is established between a TV and a mobile phone but is switched to another signal source, a user cannot hear a prompt tone of an incoming call and cannot answer the call in a timely manner.

As seen from the above solution, in the intelligent control method provided in the present disclosure, in a process of transmitting display data and audio data for a projection device in real time through a data channel connected to the projection device and monitoring a state of the data channel and an output state of the audio data, when it is detected that the state of the data channel is a connected state and the output state of the audio data on the projection device is an effective output state, an audio device that controls a real-time output is switched to a playback device for output. The playback device herein is a device different from the projection device. Therefore, when the audio data cannot be effectively output on the projection device, the audio data output by a projected device is switched to the playback device different from the projection device for output. The data channel between the projected device and the projection device is still in a connected state. Therefore, a user can listen to the audio data output by the projected device through the playback device without affecting a reception of the display data by the projection device.

As the user needs the projected device to continue to use the projection device to output the audio data and the display data, the user can perform operations on the projected device and/or the projection device, so that the projection device continues to output the audio data and the display data for the projected device.

Figure 8:
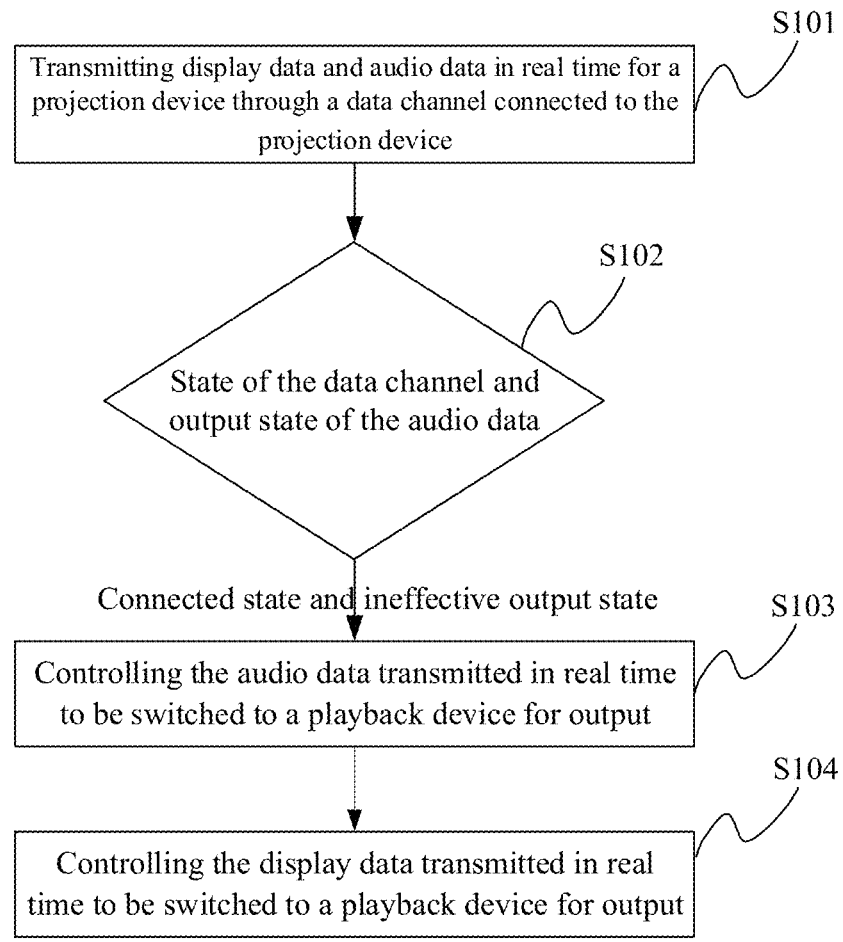
FIG. 8 illustrates another flowchart of an intelligent control method consistent with various embodiments of the present disclosure.

In an implementation, in the embodiment, when it is detected in S102 that that the state of the data channel is a connected state but the output state of the audio data on the projection device is an ineffective output state, as shown in FIG. 8, following steps may also be performed.

In S104: controlling the display data transmitted in real time to be switched to the playback device for output.

The playback device is a device with a screen display function and a sound playback function, such as a mobile phone as a projection device. In the embodiment, when it is detected that the state of the data channel is a connected state but the output state of the audio data on the projection device is an ineffective output state, that is, when a user around the projection device cannot listen to the audio data transmitted from the projected device to the projection device, the audio data that cannot be effectively output by the projection device is output through the playback device, while the display data is also output through the playback device, thereby enabling the user to listen to the audio data and view the display data through a same device, that is, the playback device.

As shown in FIG. 8, S104 can be performed after S103, or S104 and S103 can also be performed simultaneously, or S104 can be performed before S103. Different technical solutions formed by different performance sequences of S104 and S103 are all within the protection scope of the present disclosure.

Figure 9:
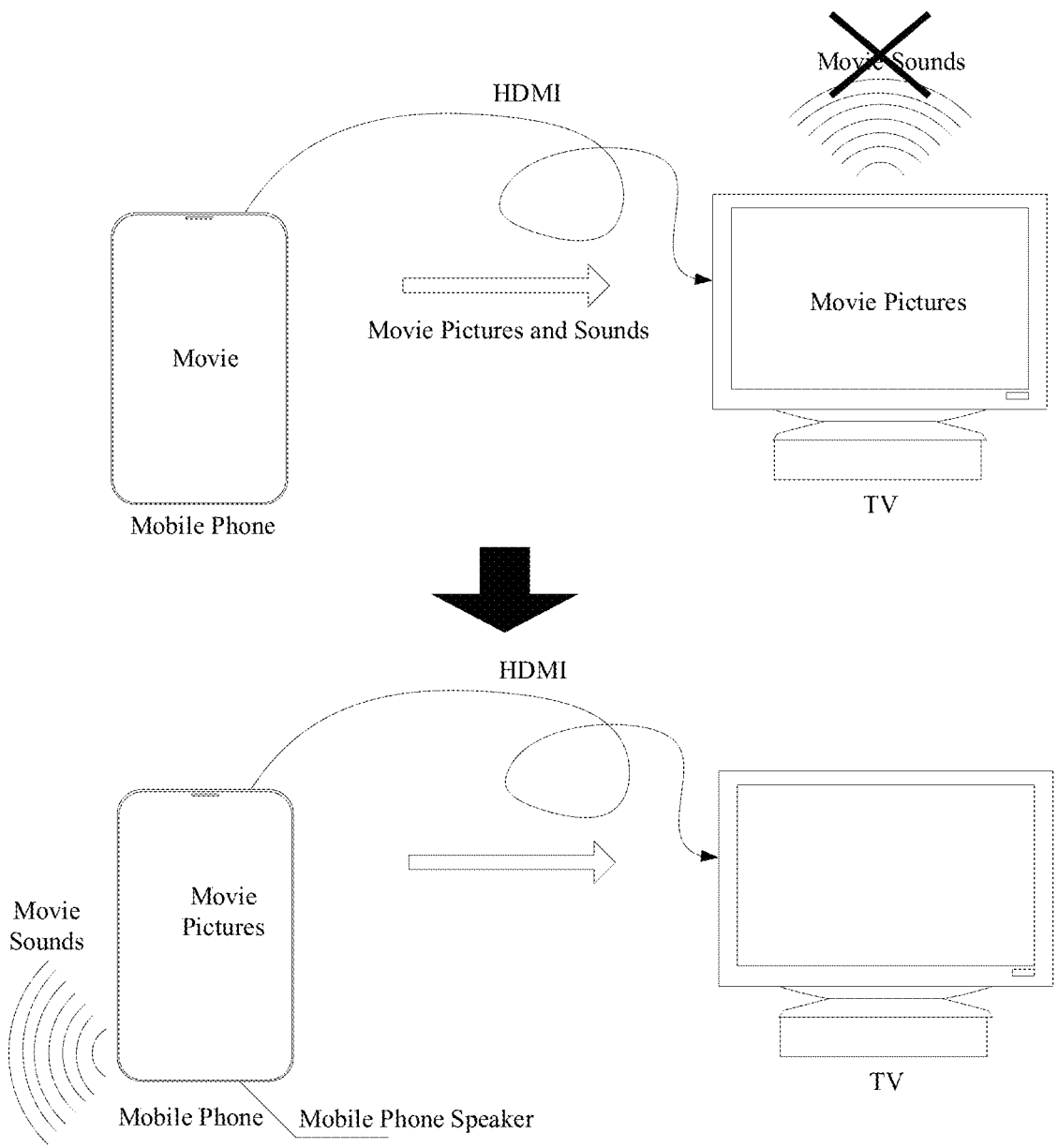
FIG. 9 illustrates another application example consistent with various embodiments of the present disclosure.

For example, as shown in FIG. 9, when it is detected that movie sounds transmitted by a mobile phone are not output on a TV, the movie sounds of the mobile phone are switched to a mobile phone speaker for output, and movie pictures of the mobile phone are switched back to a display screen of mobile phone for output. A user can listen to the movie sounds from a mobile phone speaker while watching the movie pictures on the display screen of the mobile phone, thereby avoiding a situation that when an HDMI channel is established between a TV and a mobile phone but is switched to another signal source, a user cannot hear movie sounds or watch movie pictures.

Figure 10:
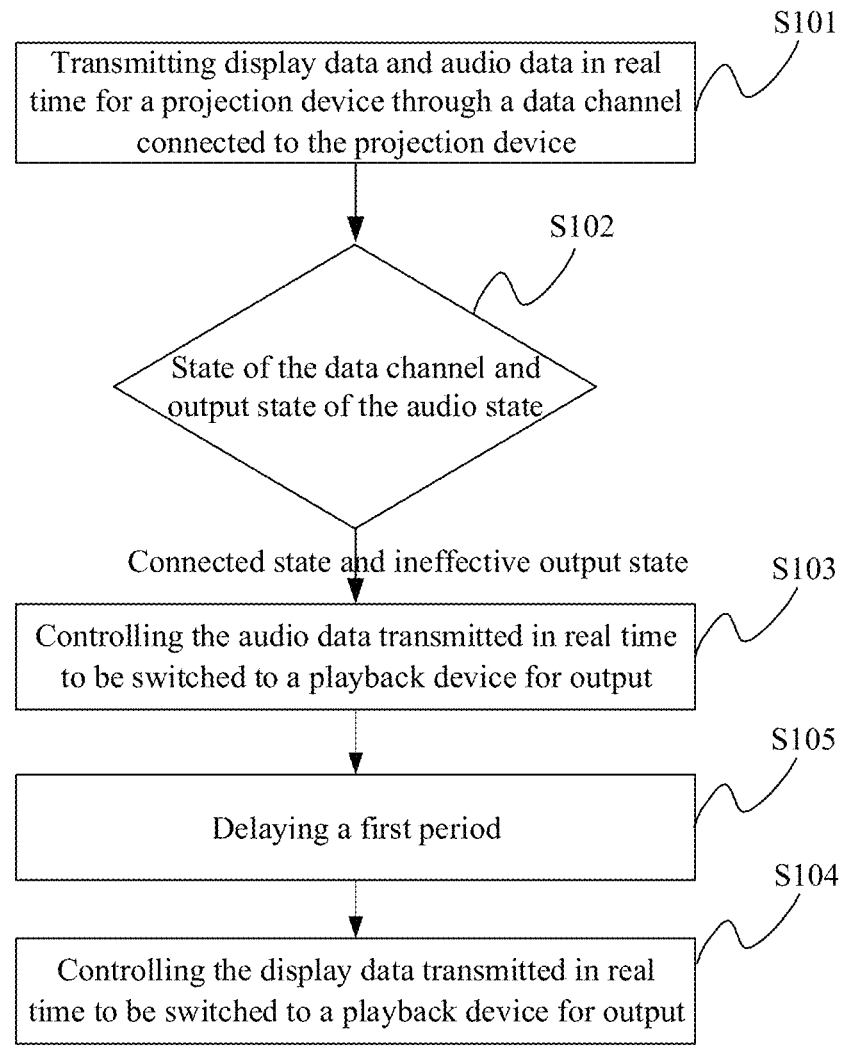
FIG. 10 illustrates another flowchart of an intelligent control method consistent with various embodiments of the present disclosure.

Further, as shown in FIG. 10, before S104, the method in the embodiment may further include a following step.

In S105: delaying for a first period.

The first period may be a preset value and may be configured or modified on the projected device in advance by a user.

That is, in the embodiment, when it is detected that the state of the data channel is a connected state but the output state of audio data on the projection device is an ineffective output state, that is, when a user around the projection device cannot listen to the audio transmitted from the projected device to the projection device, after the audio data that cannot be effectively output by the projection device is output through the playback device, after a waiting of the first period, the display data is also output through the playback device, so that the user can listen to the audio data and watch the display data through a same device, that is, the playback device.

Figure 11:
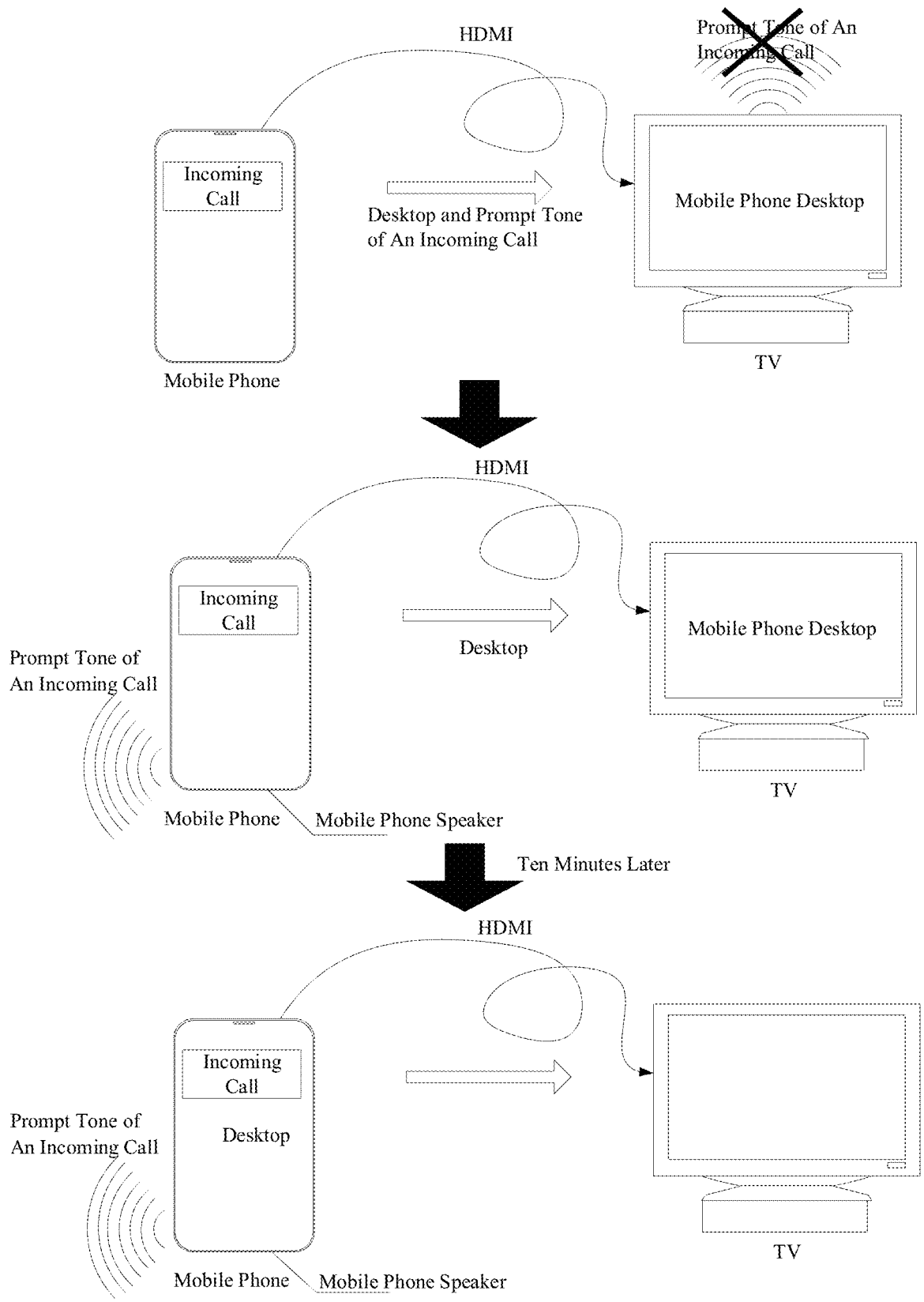
FIGS. 11-12 illustrate other application examples consistent with various embodiments of the present disclosure.

For example, as shown in FIG. 11, when it is detected that sounds transmitted by a mobile phone cannot be output normally on a TV, the sounds of the mobile phone is switched to a mobile phone speaker for output, and after a delay of 10 minutes, a mobile phone desktop is switched back to a display screen of the mobile phone for output. Therefore, when there is an incoming call on the mobile phone, a prompt tone of the incoming call of the mobile phone is output through the mobile phone speaker, which prompts a user that of the incoming call on the mobile phone, thereby avoiding a situation that when an HDMI channel is established between a TV and a mobile phone but is switched to another signal source, a user cannot hear a prompt tone of an incoming call and cannot answer the call in time.

Figure 12:
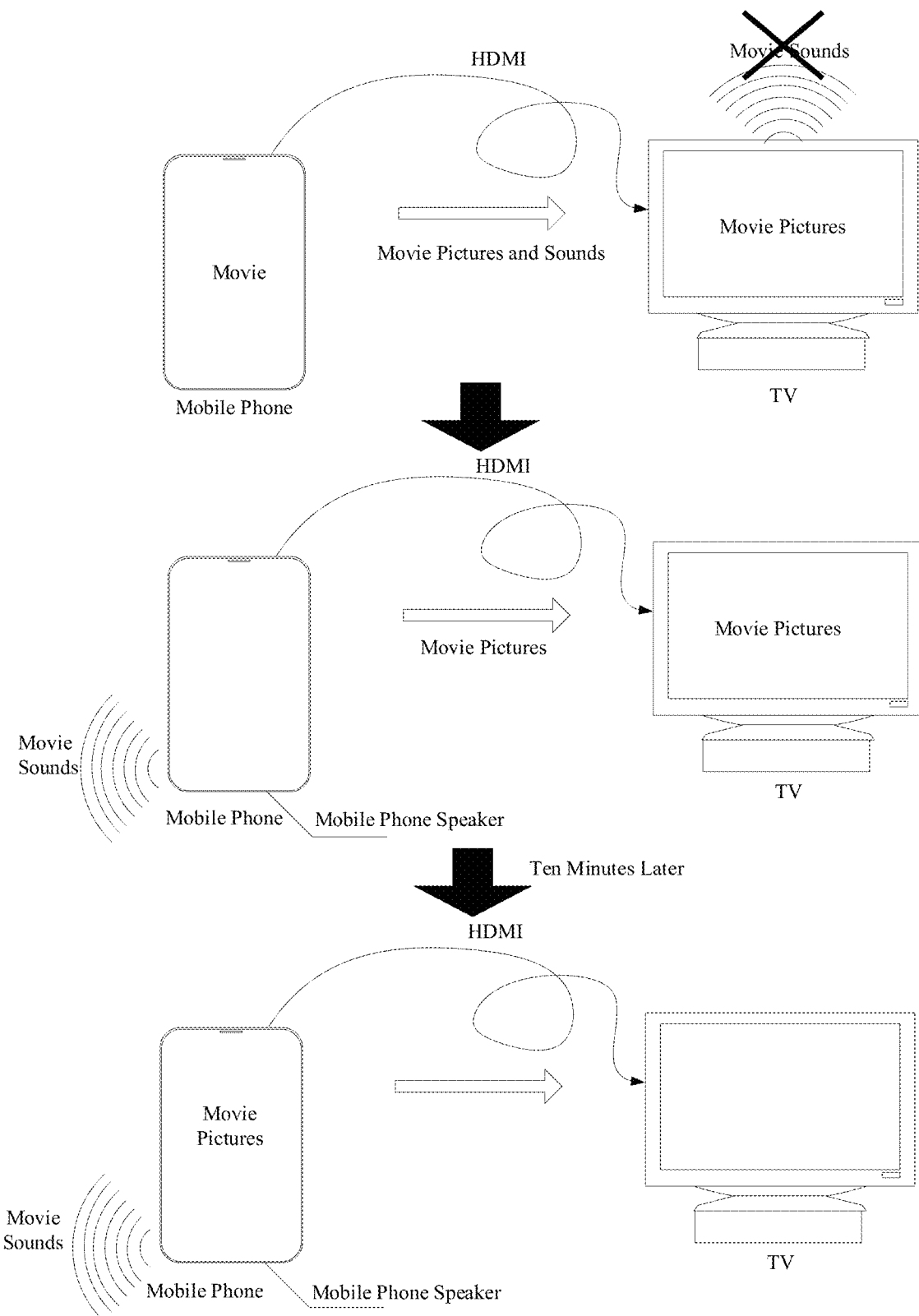

For another example, as shown in FIG. 12, when it is detected that a TV does not output movie sounds transmitted by a mobile phone, the movie sounds of the mobile phone is switched to a mobile phone speaker for output, and after a delay of 10 minutes, movie pictures of the mobile phone are switched back to a display screen of the mobile phone for output. thereby avoiding a situation that when an HDMI channel is established between a TV and a mobile phone but is switched to another signal source, a user cannot hear movie sounds and cannot watch movie pictures.

Figure 13:
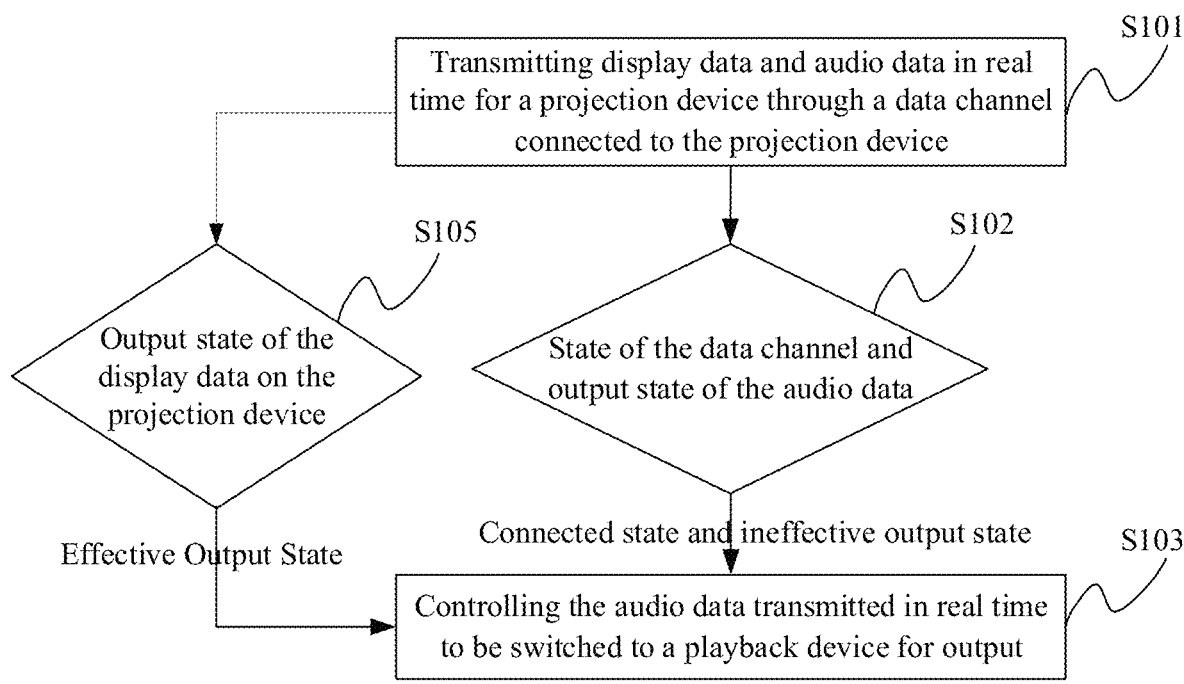
FIG. 13 illustrates another flowchart of an intelligent control method consistent with various embodiments of the present disclosure.

In an implementation, as shown in FIG. 13, a following step may also be included before S103 in the embodiment.

In S105: monitoring the output state of display data on the projection device.

Figure 14:
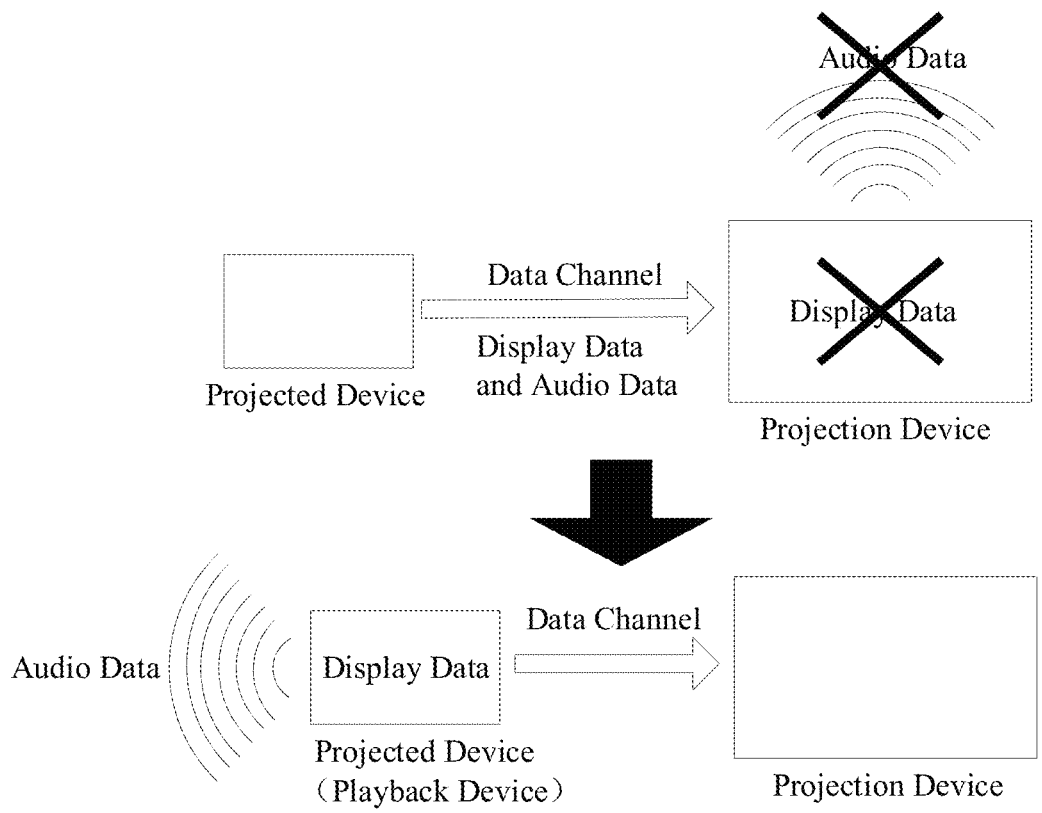
FIGS. 14-19 illustrate other application examples consistent with various embodiments of the present disclosure.

If the output state of the display data on the projection device is an effective output state, in S103, the playback device that controls the audio data to be switched is a device different from the projected device. That is, the projection device outputs the display data transmitted by the projected device and the playback device outputs the audio data transmitted by the projected device, that is, as shown in FIG. 5, the display data and the audio data on the projected device are output on different devices respectively. When the output state of the display data on the projection device is an ineffective output state, in S103, the playback device that controls the audio data to be switched may be a same device as the projected device. Therefore, in the embodiment, while the audio data is controlled to be switched to the projected device for output, or after the audio data is controlled to be switched to the projected device for output, as shown in FIG. 14, the display data can also be switched to the projected device for output.

In an implementation, the output state of the display data on the projection device being an ineffective output state may include that projection configuration parameters on the projected device corresponding to the projection device, the projected device receiving an output switching message sent by the projection device and the output switching message being generated and output when the projection device does not effectively output the display data. Therefore, if no screen switching message is received on the projection device, the output state of the display data on the projection device is an effective output state.

In another implementation, the output state of the display data on the projection device being an effective output state may include that projection configuration parameters on the projected device corresponding to the projection device, and the projected device not receiving a display feedback message sent by the projection device after sending a display monitoring message to the projection device. The display monitoring message can be sent by the projected device according to a preset sending frequency, and the display feedback message is generated and sent to the projected device when the projection device receives the display monitoring message and does not output the display data effectively. Therefore, if no display feedback message is received on the projection device, the output state of the display data on the projection device is an effective output state.

In another implementation, the output state of the display data on the projection device being an effective output state is that projection configuration parameters on the projected device corresponding to the projection device, and a similarity between picture data for the projection device obtained by the projected device and the display data is greater than a picture threshold.

In a specific implementation, the picture data obtained by the projected device can be obtained by capturing images on the projection device through an image acquisition device on the projected device, such as capturing screen pictures on a TV through a camera on a mobile phone. Limited by a location of the projected device, the image acquisition device on the projected device may not capture the picture data including the projection device. Therefore, in the embodiment, the picture data can be captured by a third-party capture device and sent to the projected device. The third-party capture device corresponds to the projection device and can capture a display picture on the projection device. For example, an indoor camera in a space where a TV is located captures an image including a display picture of the TV and sends the image to an indoor mobile phone. Therefore, in the embodiment, the picture data including the display picture of the projection device is compared with the display data of the screen projected device, such as pixels, to obtain a similarity between the picture data and the display data. After the similarity is compared with a picture threshold, if the similarity between the picture data and the display data is greater than the picture threshold, which means that the picture data is similar to the display data, the output state of the display data on the projection device can be determined to be an effective output state.

Figure 15:
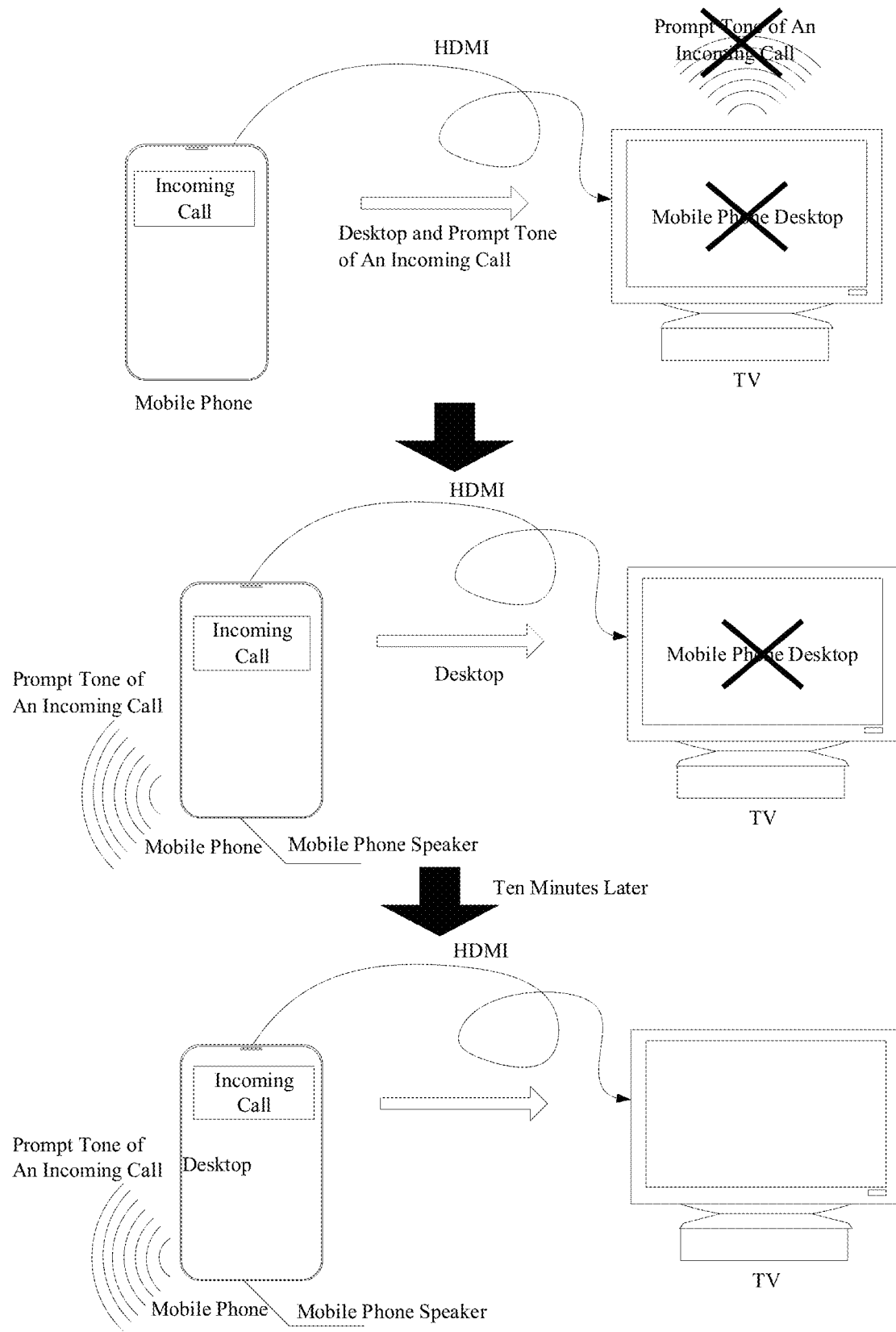
Figure 16:
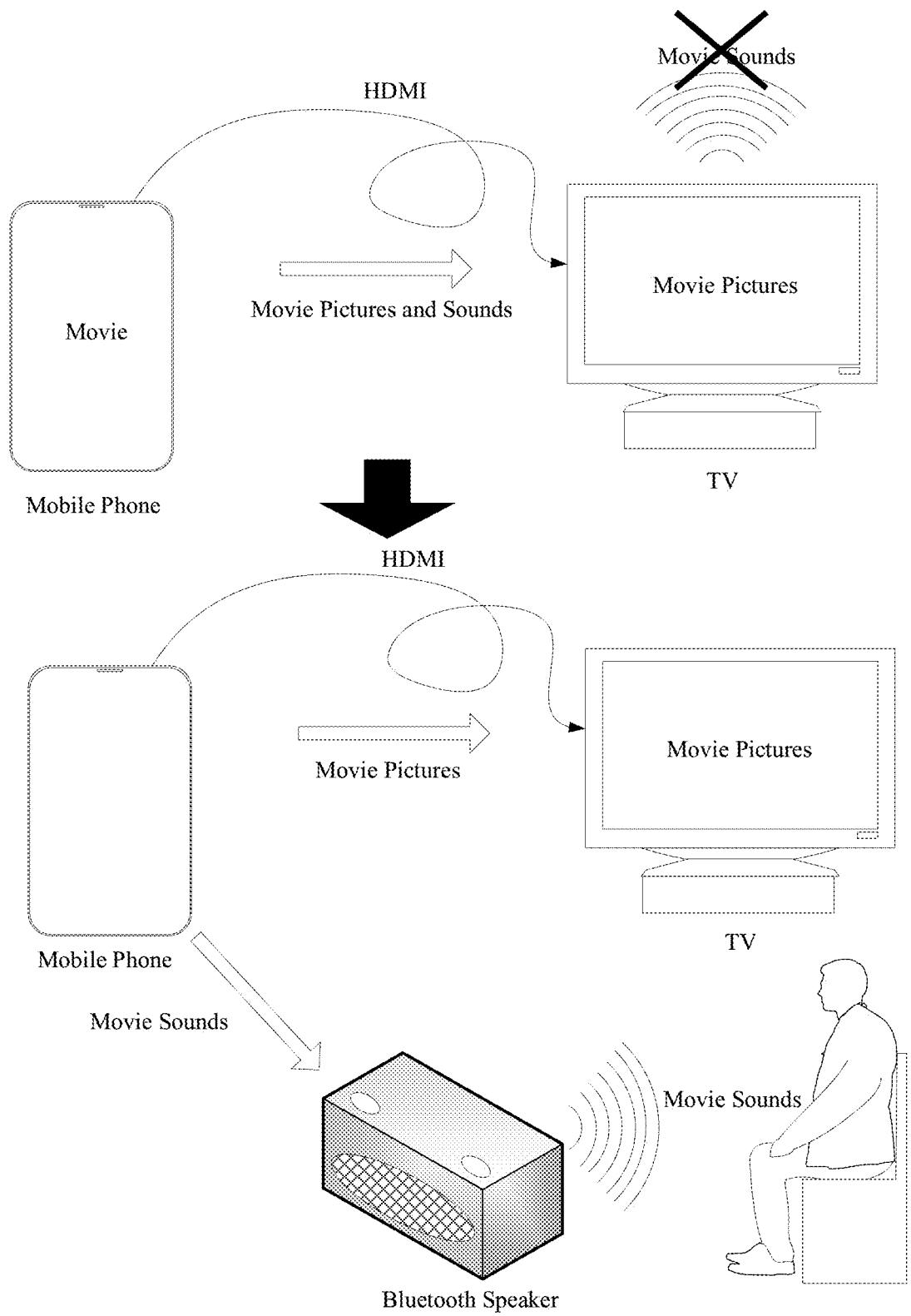

For example, when it is detected, that sounds transmitted by a mobile phone cannot be output normally on a TV, if a picture transmitted by the mobile phone can be output normally on the TV, as shown in FIG. 6, the sounds of the mobile phone can be switched to a Bluetooth speaker for output. If the image transmitted by the mobile phone cannot be output normally on the TV, the sounds of the mobile phone can be switched to a mobile phone speaker for output. Therefore, as shown in FIG. 15, after a waiting of 10 minutes, a mobile phone desktop can be switched back to a display screen of the mobile phone for output. If there is an incoming call on the mobile phone, a prompt tone of the incoming call of the mobile phone is output through the mobile phone speaker, and the incoming call screen is displayed on the mobile phone, which prompts a user of the incoming call and caller's information on the mobile phone, thereby avoiding a situation that when an HDMI channel is established between a TV and a mobile phone but is switched to another signal source, a user cannot hear an prompt tone of an incoming call and cannot answer the call in time.

For another example, as shown in FIG. 66, when it is detected that a TV does not output movie sounds transmitted by a mobile phone, if the TV can normally output movie pictures transmitted by the mobile phone, the sounds of the mobile phone are switched to a Bluetooth speaker for output. A user can hear the movie sounds output by the Bluetooth speaker while watching the movie pictures on the TV. If the movie picture transmitted by the mobile phone cannot be output normally on the TV, the movie sounds of the mobile phone are switched to a mobile phone speaker for output. After a delay of 10 minutes, as shown in FIG. 15, the movie pictures of the mobile phone are switched back to a display screen of the mobile phone for output. The user can hear the movie sounds output by the mobile phone speaker while watching the movie picture on the display screen of the mobile phone, thereby avoiding a situation that when an HDMI channel is established between a TV and a mobile phone but is switched to another signal source, a user cannot listen to movie sounds or watch movie pictures.

Specifically, in S102, the output state of the audio data on the projection device being an ineffective output state may include following implementations.

In an implementation, the output state of the audio data on the projection device being not effectively output is that projection configuration parameters on the projected device corresponding to the projection device, and the projected device receiving an output switching message sent by the projection device.

The projection configuration parameters corresponding to the projection device refers to remaining a transmission of audio data between the projected device and the projection device. That is, the transmission of the audio data is not switched on the projected device, and the audio data remains in a state of being transmitted to the projection device through the data channel. The output switching message is generated and output when the projection device does not output audio data effectively. That is, when the data channel is connected between the projection device and the projected device, if the projection device switches a signal source so that the projection device cannot effectively output the audio data of the projected device, the projection device generates the output switching message and sends the output switching message to the projected device to notify the projected device that the audio data thereof cannot be output. Therefore, when the projected device receives the output switching message sent by the projection device and the projection configuration parameters on the projected device correspond to the projection device, it can be determined that the transmission of the audio data of the projected device is not switched on the projected device, and the audio data remains in a state of being transmitted to the projection device through the data channel. However, when the projection device switches the signal source, the projection device does not effectively output the audio data transmitted by the projected device. In the embodiment, in S103, the audio data transmitted in real time can be controlled to be switched to a playback device different from the projection device for output. Further, after a delay of the first period, the display data can be controlled to be switched to the playback device for output.

Figure 17:
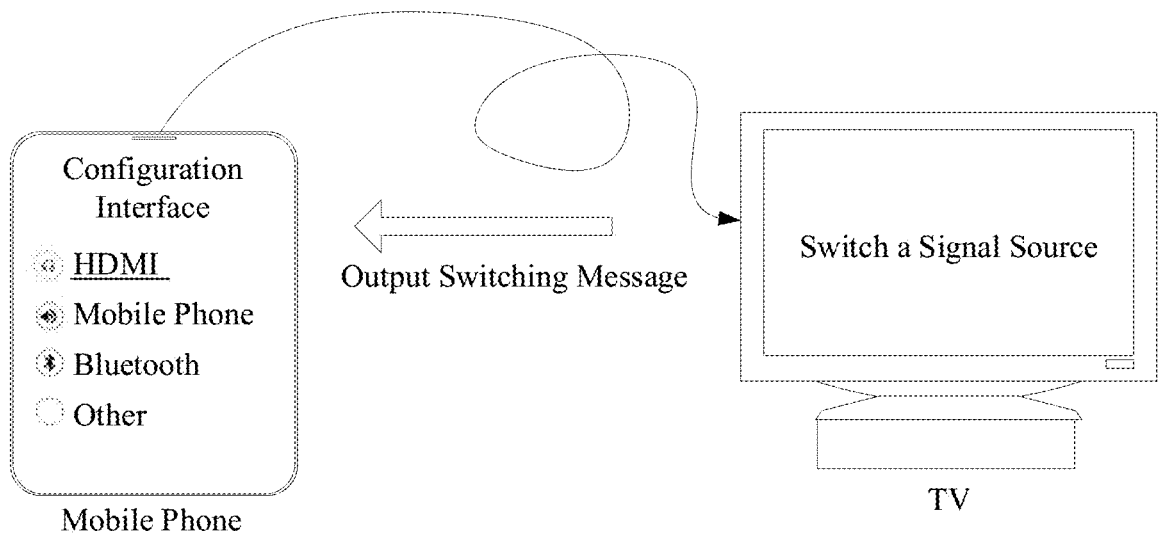

For example, as shown in FIG. 17, projection configuration parameters of a configuration interface on a mobile phone still correspond to a HDMI of a TV. The mobile phone receives an output switching message sent by the TV to determine that the TV switches a signal source and no longer continues to output sounds transmitted by the mobile phone. The mobile phone switches the sounds to a mobile phone speaker for output. After a waiting of 10 minutes, as shown in FIG. 11, a mobile phone desktop is switched back to a display screen of the mobile phone for output. If there is an incoming call on the mobile phone, a prompt tone of the incoming call of the mobile phone is output through the mobile phone speaker, and an incoming call screen is displayed on the mobile phone, thereby prompting a user of the incoming call and caller's information on the mobile phone, thereby avoiding a situation that when an HDMI channel is established between a TV and a mobile phone but is switched to another signal source, a user cannot hear a prompt tone of an incoming call and cannot answer the call in time.

In another implementation, the output state of the audio data on the screen-casting device being an ineffective output is projection configuration parameters on the projected device corresponding to the projection device, and the projected device receiving a monitoring feedback message sent by the projection device after sending a monitoring request message to the projection device.

The monitoring request message may be sent by the projected device according to a preset sending frequency or may be sent by the projected device when there is audio data corresponding to a target application program for transmission. The target application program can be an application program that comes with an operating system of the projected device, such as a short message, an address book, or a mailbox. Alternatively, the target application can be a third-party application programs installed on the operating system of the projected device, such as a chat application program or a game application program.

The monitoring feedback message is generated and sent to the projected device when the projection device receives the monitoring request message and does not output audio data effectively. That is, when the data channel is connected between the projection device and the projected device, the projected device sends the monitoring request message to the projection device according to a certain sending frequency. Alternatively, when the projected device transmits the audio data corresponding to the target application to the projection device, the projected device sends the monitoring request message to the projection device for being informed of whether the audio data is effectively output. If the projection device switches a signal source so that the projection device cannot effectively output the audio data of the projected device, the projection device generates a corresponding monitoring feedback message for the received monitoring request message and sends the monitoring feedback message to the projected device to notify the projected device that the audio data thereof cannot be output. Therefore, when the projected device receives the monitoring feedback message sent by the projection device and the projection configuration parameters on the projected device correspond to the projection device, it can be determined that a transmission of audio data of the projected device is not switched on the projected device, and the audio data remains in a state of being transmitted to the projection device through the data channel. However, when the projection device switches a signal source, the projection device does not effectively output the audio data transmitted by the projected device. In the embodiment, in S103, the audio data transmitted in real time can be controlled to be switched to a playback device different from the projection device for output. Further, after a delay of the first period, the display data can be controlled to be switched to the playback device for output.

Figure 18:
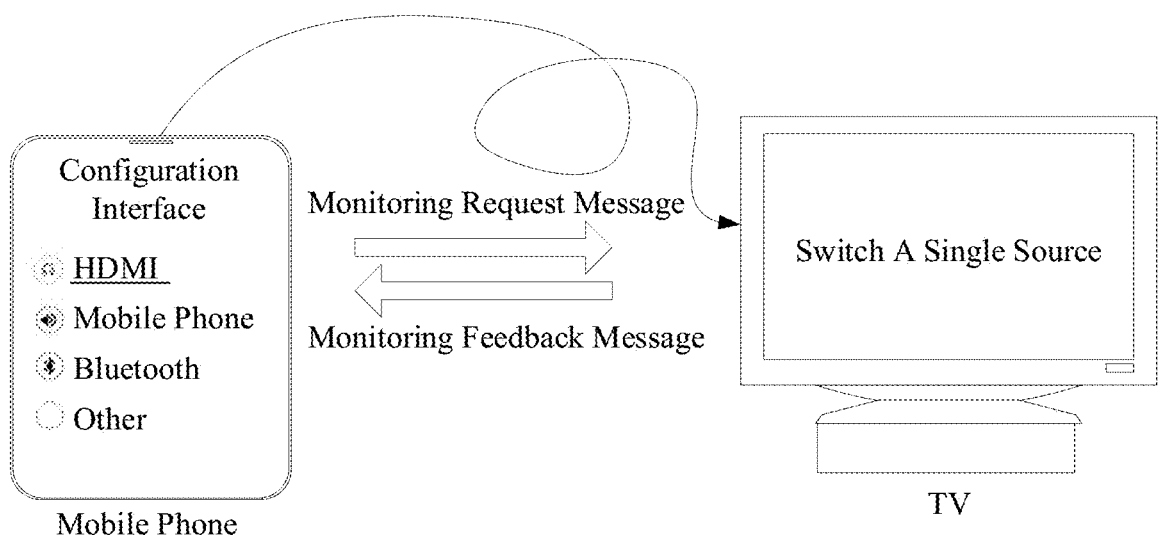

For example, as shown in FIG. 18, projection configuration parameters of a configuration interface on a mobile phone still correspond to a HDMI of a TV. However, after the mobile phone sends a monitoring request message at a frequency of once every 5 minutes, the mobile phone receives a monitoring feedback message sent by the TV, so the mobile phone can determine that the TV switches a signal source and no longer continues to output sounds transmitted by the mobile phone. The mobile phone switches the sound to a mobile phone speaker for output. After a waiting of 10 minutes, as shown in FIG. 11, a mobile phone desktop is switched back to a display screen of the mobile phone for output. If there is an incoming call on the mobile phone, a prompt tone of the incoming call of the mobile phone is output through the mobile phone speaker, and an incoming call screen is displayed on the mobile phone, thereby prompting a user of the incoming call and caller's information on the mobile phone, thereby avoiding a situation that when an HDMI channel is established between a TV and a mobile phone but is switched to another signal source, a user cannot hear a prompt tone of an incoming call and cannot answer the call in time.

In another implementation, the output state of the audio data on the projection device being not effectively output is that projection configuration parameters on the projected device corresponding to the projection device, and a similarity between a sound parameter and audio data in a surrounding environment where the projected device is located is less than or equal to a similarity threshold.

The similarity threshold can be set or modified according to a sensitivity requirement and an accuracy requirement. The sound parameter in a surrounding environment where the projected device is located represent a sound parameter that a user can hear. As the similarity between the sound parameter and the audio data is less than or equal to the similarity threshold, it can be determined that the sound parameter and the audio data are quite different. That is, the projection device does not effectively output the audio data of the projected device, so that the sound parameter in the surrounding environment of the projected device do not match the audio data. That is, when the data channel is connected between the projection device and the projected device, the sound parameter in the surrounding environment where the screen-casting device is located are continuously monitored. When the similarity between the sound parameter and the audio data is less than or equal to the similarity threshold, it can be determined that the projection device switches a signal source so that the projection device cannot effectively output the audio data of the projected device. When the projected device finds that the similarity between the sound parameter in the surrounding environment and the audio data is less than or equal to the similarity threshold and the projection configuration parameters on the projected device correspond to the projection device, it can be determined that a transmission of the audio data of the projected device is not switched on the projected device, and the audio data remains in a state of being transmitted to the projection device through the data channel. However, when the projection device switches the signal source, the projection device does not effectively output the audio data transmitted by the projected device. In the embodiment, in S103, the audio data transmitted in real time can be controlled to be switched to a playback device different from the projection device for output. Furthermore, after a delay of the first period, the display data can be controlled to be switched to the playback device for output.

In a specific implementation, the sound parameter, such as a sound signal captured by a microphone of a mobile phone in a surrounding, can be captured by a sound capture device on the projected device. Alternatively, the sound parameter can be captured and sent by a third-party acquisition device connected to the projected device. For example, an indoor camera on a microphone captures and sends a sound signal in a room to an indoor mobile phone.

Figure 19:
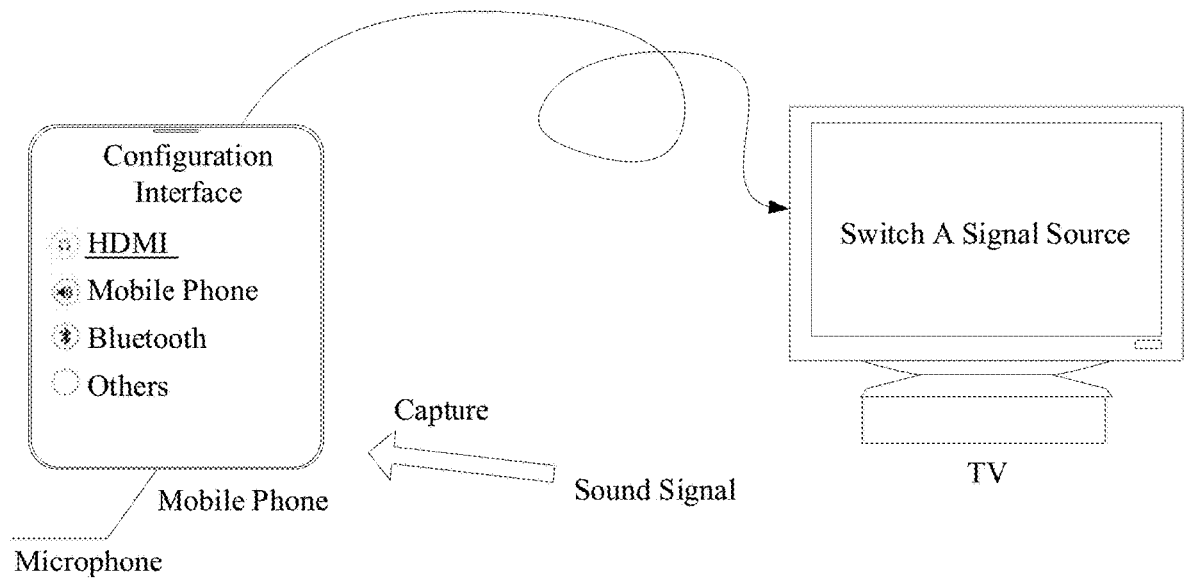

For example, as shown in FIG. 19, projection configuration parameters of a configuration interface on a mobile phone still correspond to a HDMI of a TV. However, the mobile phone captures a surrounding sound signal through a microphone and compares the surrounding sound signal with sound data transmitted from the mobile phone to the TV. As a similarity between the surrounding sound signal and the sound data transmitted from the mobile phone to the TV is less than or equal to a similarity threshold, the mobile phone can determine that the TV switches a signal source and no longer continues to output the sound transmitted by the mobile phone. The mobile phone switches the sound to a mobile phone speaker for output. After a waiting of 10 minutes, as shown in FIG. 11, a mobile phone desktop is switched back to a display screen of the mobile phone for output. If there is an incoming call on the mobile phone, a prompt tone of the incoming call of the mobile phone is output through the mobile phone speaker, and an incoming call screen is displayed on the mobile phone, thereby prompting a user of the incoming call and caller's information on the mobile phone, thereby avoiding a situation that when an HDMI channel is established between a TV and a mobile phone but is switched to another signal source, a user cannot hear a prompt tone of an incoming call and cannot answer the call in time.

In addition, the sound parameter can be captured when the audio data corresponds to a target application program in the projected device. The target application program can be an application program that comes with an operating system of the projected device, such as a short message, an address book, or a mailbox. Alternatively, the target application program can be a third-party application program installed on an operating system of the projected device, such as a chat application program or a game application program.

In the embodiment, a sound parameter in a surrounding environment of the projected device can be captured only when the projected device transmits audio data related to a target application to the projection device, to determine whether the projection device effectively outputs the audio data. For example, when a mobile phone transmits a prompt tone of an incoming call to a TV, a sound signal around the mobile phone is captured. As a similarity between the captured sound signal and the prompt tone of the incoming call is relatively small and smaller than a similarity threshold, the mobile phone can determine that the TV switches a signal source and no longer continues to output the prompt tone of the incoming call transmitted by the mobile phone. The mobile phone switches the prompt tone of the incoming call to a mobile phone speaker for output to prompt a user of the incoming call on the mobile phone. Further, after a waiting of 10 minutes, a mobile phone desktop can be switched back to an mobile phone display screen for output, thereby avoiding a situation that when an HDMI channel is established between a TV and a mobile phone but is switched to other signal sources, a user cannot hear a prompt tone of an incoming call and cannot answer the call in time.

Figure 20:
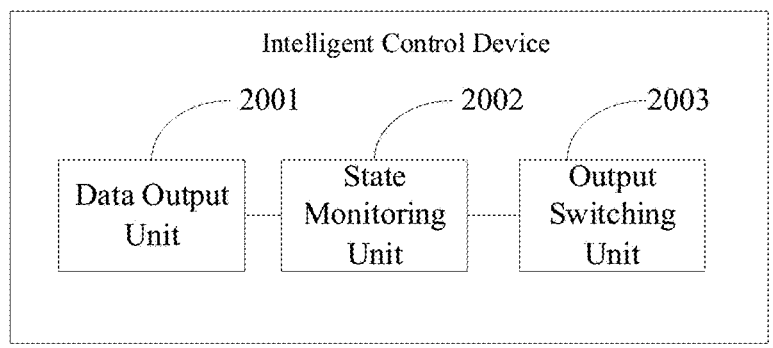
FIG. 20 illustrates a schematic diagram of an intelligent control device consistent with various embodiments of the present disclosure.

FIG. 20 illustrates a schematic diagram of an intelligent control device provided in the present disclosure. The device can be applied to an electronic device capable of establishing a data channel with a projection device, that is, a projected device, such as a mobile phone, a pad, a notebook, or a computer with a display screen. The projection device can be a TV, a notebook or a computer. As shown in FIG. 2, a data channel is established between the projected device and the projection device, such as a data channel realized by HDMI between a mobile phone or a notebook and a TV or a data channel realized by another wired or wireless interface capable of data transmission.

Specifically, in the embodiment, the device may include a data output unit 2001, and a state monitoring unit 2002. The data output unit is configured for transmitting display data and audio data for a projection device in real time through a data channel connected to the projection device. The state monitoring unit is configured for monitoring a state of the data channel and an output state of the audio data on the projection device and triggering an output switching unit 2003 as the state of the data channel is a connected state but the output state of the audio data on the projection device is an ineffective output state. The output switching unit 2003 is configured for controlling the audio data transmitted in real time to be switched to the playback device for output.

As can be seen from the above solution, in the intelligent control device provided in the present disclosure, in a process of transmitting display data and audio data for a projection device in real time through a data channel connected to the projection device and monitoring a state of the data channel and an output state of the audio data, when it is detected that the state of the data channel is a connected state and the output state of the audio data on the projection device is an effective output state, an audio device that controls a real-time output is switched to a playback device for output. The playback device herein is a device different from the projection device. Therefore, when the audio data cannot be effectively output on the projection device, the audio data output by a projected device is switched to the playback device different from the projection device for output. The data channel between the projected device and the projection device is still in a connected state. Therefore, a user can listen to the audio data output by the projected device through the playback device without affecting a reception of the display data by the projection device.

In an implementation, as the state monitoring unit 2002 monitors that a state of the data channel is a connected state and an output state of the audio data on the projection device is an ineffective output state, the output switching unit 2003 is also configured to control the display data transmitted in real time to be switched to the playback device for output.

Further, the output switching unit 2003 delays the first period before controlling the display data transmitted in real time to be switched to the playback device for output.

In an implementation, before the output switching unit 2003 controls the audio data transmitted in real time to be switched to the playback device for output, the state monitoring unit 2002 is further configured to monitor an output state of the display data on the projection device. As the output state of the display data on the projection device is an effective output state, the playback device is different from the projected device.

In an implementation, the output state of the audio data on the projection device being an ineffective output state includes that projection configuration parameters on the projected device corresponding to the projection device, and the projected device receiving an output switching message sent by the projection device. The output switching message is generated and output when the projection device does not output audio data effectively.

In an implementation, the output state of the audio data on the projection device being an ineffective output state includes that projection configuration parameters on the projected device correspond to the projection device, and the projected device receives a monitoring feedback message sent by the projection device after sending a monitoring request message to the projection device. The monitoring feedback message is generated when the projection device does not output audio data effectively.

In an implementation, the output state of the audio data on the projection device being an ineffective output state includes that projection configuration parameters on the projected device correspond to the projection device, and a similarity between the sound parameter and the audio data in a surrounding environment where the projected device is located is less than or equal to a similarity threshold.

Optionally, the sound parameter is captured when the audio data corresponds to a target application program in the projected device.

It should be noted that, for a specific implementation of each unit in the embodiment, reference may be made to a corresponding content described above, which is not described in detail herein.

Figure 21:
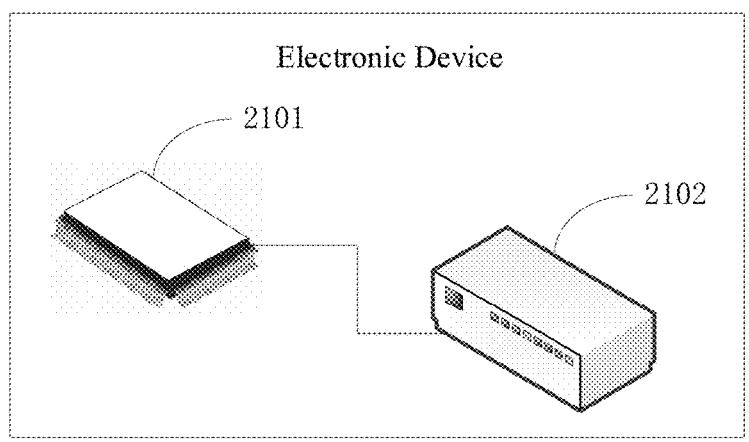
FIG. 21 illustrates a schematic diagram of an electronic device consistent with various embodiments of the present disclosure.

FIG. 21 illustrates a schematic diagram of an electronic device provided in the present disclosure. The electronic device may be an electronic device capable of establishing a data channel with a projection device, that is, a projected device, such as a mobile phone, a pad, a notebook, or a computer with a display screen. The projection device can be a TV, a notebook or a computer. As shown in FIG. 2, a data channel is established between the projected device and the projection device, such as a data channel realized by HDMI between a mobile phone or a notebook and a TV or a data channel realized by another wired or wireless interface capable of data transmission.

Specifically, the electronic device in the embodiment may include a memory 2101 and a processor 2102. The memory 2101 is configured for storing application programs and data generated by running the application programs. The processor 2102 is configured for transmitting display data and audio data for a projection device in real time through a data channel connected to the projection device, monitoring a state of the data channel and an output state of the audio data on the projection device and controlling the audio data transmitted in real time to be switched to a playback device for output as the state of the data channel is a connected state and the output state of the audio data on the projection device is an ineffective output state.

In addition, as a projected device, the electronic device may also include a monitor that can be used to output the display data, and a player that can be used to output the audio data. The electronic device can also include various interfaces to facilitate a realization of the data channel connected to the projection device.

As can be seen from the above solution, in the electronic device provided in the present disclosure, in a process of transmitting display data and audio data for a projection device in real time through a data channel connected to the projection device and monitoring a state of the data channel and an output state of the audio data, when it is detected that the state of the data channel is a connected state and the output state of the audio data on the projection device is an effective output state, an audio device that controls a real-time output is switched to a playback device for output. The playback device herein is a device different from the projection device. Therefore, when the audio data cannot be effectively output on the projection device, the audio data output by a projected device is switched to the playback device different from the projection device for output. The data channel between the projected device and the projection device is still in a connected state. Therefore, a user can listen to the audio data output by the projected device through the playback device without affecting a reception of the display data by the projection device.

Taking a mobile phone to project a screen to a TV through a mobile phone desktop as an example, when the mobile phone desktop is projected to the TV, a channel playing music/video on the mobile phone can also be transferred to a speaker of the TV. If a user switches a signal source of the TV on the TV, such as switching to a cable TV, the sound channel of the mobile phone remains on a HDMI channel of the TV. However, sounds of the mobile phone cannot be output through a TV speaker. If there is an incoming call or a new message on the phone, the user cannot receive a prompt tone and cannot reply in time.

Therefore, in view of the above defect, the present disclosure proposes an intelligent control scheme for screen projection output of a mobile phone. If a signal source is switched on one end of a TV, a channel connected to the TV on a mobile phone remains connected to the TV. To effectively output sounds of the mobile phone, the sounds of the mobile phone can be switched back to a mobile phone speaker to avoid a situation that a user cannot hear a prompt tone.

In a specific implementation, in a scenario where a mobile phone is projected to a TV, if a signal source channel currently activated on the TV is a channel of a mobile phone desktop, the TV can effectively output sounds on the mobile phone. If the signal source channel currently activated on the TV is not a channel of the mobile phone desktop, the TV outputs sounds of another signal source, and the sounds on the mobile phone cannot be effectively output. Based on an intelligent control scheme in the present disclosure, the sounds of the mobile phone are switched back to the mobile phone speaker or to another device, such as a Bluetooth speaker, instead of being transmitted to the TV, so that a user can hear a prompt tone output by the mobile phone speaker or the Bluetooth speaker.

Further, a user can reset a screen projection setting on a mobile phone, so that the TV is switched to the mobile phone desktop again, and pictures and sounds are output to the mobile phone.

Various embodiments in the present specification are described in a progressive manner. Each embodiment focuses on differences from other embodiments. Same and similar parts between the various embodiments can be referred to each other. For a device disclosed in the embodiments, since the device corresponds to a method disclosed in the embodiments, the description is relatively simple, and the relevant part can be referred to ae description of the method.

Professionals can further realize that units and algorithm steps of each example described in conjunction with the embodiments disclosed herein can be implemented in electronic hardware, computer software, or a combination thereof. To clearly illustrate an interchangeability between hardware and software, components and steps of each example have been described generally according to their functions. Whether the functions are performed in a hardware or software way depends on specific applications of technical solutions and design constraints. Professionals may use different methods for each specific application to realize the described functions, and such implementation should not be considered beyond the scope of the present disclosure.

The steps of the method or the algorithm described in conjunction with the embodiments disclosed herein may be implemented by hardware or a software module executed by a processor or a combination thereof. The software module may be provided in a random-access memory (RAM), a memory, a read-only memory (ROM), an electrically programmable ROM, an electrically erasable programmable ROM, a register, a hard disk, a removable disk, a CD-ROM or a storage medium of any other forms well-known in the art.

As disclosed, in an intelligent control method and device and an electronic device provided by the present disclosure, in a process of transmitting display data and audio data for a projection device in real time through a data channel connected to the projection device and monitoring a state of the data channel and an output state of the audio data, when it is detected that the state of the data channel is a connected state and the output state of the audio data on the projection device is an effective output state, an audio device that controls a real-time output is switched to a playback device for output. The playback device herein is a device different from the projection device. Therefore, when the audio data cannot be effectively output on the projection device, the audio data output by a projected device is switched to the playback device different from the projection device for output. The data channel between the projected device and the projection device is still in a connected state. Therefore, a user can listen to the audio data output by the projected device through the playback device without affecting a reception of the display data by the projection device.

The above description of the disclosed embodiments enables a person skilled in the art to implement or use the present disclosure. Various modifications to these embodiments will be apparent to a person skilled in the art, and the general principles defined herein may be implemented in other embodiments without departing from the spirit or scope of the present disclosure. Therefore, the present disclosure is not limited to the embodiments shown herein but conforms to a widest scope consistent with the principles and novel features disclosed herein.

What is claimed is:

1. An intelligent control method, comprising:
    transmitting display data and audio data in real time for a projection device through a data channel connected to the projection device;
    monitoring a state of the data channel and an output state of the audio data on the projection device; and
    controlling the audio data transmitted in real time to be switched to a playback device for output in response to the state of the data channel being a connected state and the output state of the audio data on the projection device being an ineffective output state, in which the audio data is received but not output on the projection device.

2. The method according to claim 1, wherein, in response to the state of the data channel being the connected state and the output state of the audio data on the projection device being the ineffective output state, the method further comprises:
    controlling the display data transmitted in real time to be switched to the playback device for output.

3. The method according to claim 2, wherein before the controlling of the display data transmitted in real time to be switched to the playback device for output, the method further comprises:
    delaying for a first period.

4. The method according to claim 1, wherein before the controlling of the audio data transmitted in real time to be switched to the playback device for output, the method further comprises:
    monitoring the output state of the display data on the projection device, wherein:
    the playback device is different from a projected device in response to the output state of the display data on the projection device being an effective output state.

5. The method according to claim 1, wherein the output state of the audio data on the projection device being the ineffective output state comprises:
    projection configuration parameters on a projected device corresponding to the projection device, the projected device receiving an output switching message sent by the projection device and the output switching message being generated and output when the projection device does not effectively output the audio data.

6. The method according to claim 1, wherein the output state of the audio data on the projection device being the ineffective output state comprises:
    projection configuration parameters on a projected device corresponding to the projection device, the projected device receiving a monitoring feedback message sent by the projection device after sending a monitoring request message to the projection device, and the monitoring feedback message being generated when the projection device does not effectively output the audio data.

7. The method according to claim 1, wherein the output state of the audio data on the projection device being the ineffective output state comprises:
    projection configuration parameters on a projected device corresponding to the projection device, and a similarity between a sound parameter in a surrounding environment where the projected device is located, and the audio data being less than or equal to a similarity threshold.

8. The method according to claim 7, wherein the sound parameter is captured when the audio data corresponds to a target application program in the projected device.

9. An electronic device, comprising:
    a memory storing application programs and data generated by running the application programs; and
    a processor coupled with the memory and, when the application programs being executed, configured to:
        transmit display data and audio data for a projection device in real time through a data channel connected to the projection device;
        monitor a state of the data channel and an output state of the audio data on the projection device; and
        control the audio data transmitted in real time to be switched to a playback device for output, in response to the state of the data channel being a connected state and the output state of the audio data on the projection device being an ineffective output state, in which the audio data is received but not output on the projection device.

10. The electronic device according to claim 9, further comprising:
    a monitor outputting the display data;
    a player outputting the audio data; and interfaces, for realizing the data channel connected to the projection device.

11. The electronic device according to claim 9, wherein the processor is further configured to:
control the display data transmitted in real time to be switched to the playback device for output.

12. The electronic device according to claim 11, wherein before the display data transmitted in real time to be switched to the playback device is controlled, the processor is further configured to:
delay for a first period.

13. The electronic device according to claim 9, wherein before the audio data transmitted in real time to be switched to the playback device is controlled, the processor is further configured to monitor an output state of the display data on the projection device, wherein the playback device is different from a projected device in response to the output state of the display data on the projection device being an effective output state.

14. The electronic device according to claim 9, wherein the output state of the audio data on the projection device being the ineffective output state comprises:
projection configuration parameters on a projected device corresponding to the projection device, the projected device receiving an output switching message sent by the projection device and the output switching message being generated and output when the projection device does not effectively output the audio data.

15. The electronic device according to claim 9, wherein the output state of the audio data on the projection device being the ineffective output state comprises:
projection configuration parameters on a projected device corresponding to the projection device, the projected device receiving a monitoring feedback message sent by the projection device after sending a monitoring request message to the projection device, and the monitoring feedback message being generated when the projection device does not effectively output the audio data.

16. The electronic device according to claim 9, wherein the output state of the audio data on the projection device being the ineffective output state comprises:
projection configuration parameters on a projected device corresponding to the projection device, and a similarity between a sound parameter in a surrounding environment where the projected device is located, and the audio data is less than or equal to a similarity threshold.

17. The electronic device according to claim 16, wherein the sound parameter is captured when the audio data corresponds to a target application program in the projected device.

18. A non-transitory computer readable storage medium containing application programs, wherein when being executed, the application programs cause a processor to perform an intelligent control method, the method comprising:
transmitting display data and audio data in real time for a projection device through a data channel connected to the projection device;
monitoring a state of the data channel and an output state of the audio data on the projection device; and
controlling the audio data transmitted in real time to be switched to a playback device for output in response to the state of the data channel being a connected state and the output state of the audio data on the projection device being an ineffective output state, in which the audio data is received but not output on the projection device.

* * * * *